（12）United States Patent
Hammersmith

(10) Patent No.: US 9,450,749 B2
(45) Date of Patent: Sep. 20, 2016

(54) ONE-TIME-PAD ENCRYPTION WITH CENTRAL KEY SERVICE

(71) Applicant: Wolfgang S. Hammersmith, Seattle, WA (US)

(72) Inventor: Wolfgang S. Hammersmith, Seattle, WA (US)

( * ) Notice: Subject to any disclaimer, the term of this patent is extended or adjusted under 35 U.S.C. 154(b) by 0 days.

(21) Appl. No.: 13/918,952

(22) Filed: Jun. 15, 2013

(65) Prior Publication Data

US 2014/0369498 A1    Dec. 18, 2014
US 2015/0304104 A9    Oct. 22, 2015

Related U.S. Application Data

(63) Continuation of application No. 10/254,495, filed on Sep. 24, 2002, now Pat. No. 8,467,533, which is a continuation of application No. PCT/US01/10348, filed on Mar. 29, 2001.

(60) Provisional application No. 60/193,152, filed on Mar. 29, 2000.

(51) Int. Cl.
*H04L 9/08*    (2006.01)
*H04L 9/06*    (2006.01)

(52) U.S. Cl.
CPC ............ *H04L 9/0819* (2013.01); *H04L 9/0656* (2013.01); *H04L 9/0802* (2013.01); *H04L 9/0822* (2013.01); *H04L 9/0861* (2013.01)

(58) Field of Classification Search
CPC ............................ H04L 9/083; H04L 9/0822
USPC ......................... 380/277, 28, 37, 46
See application file for complete search history.

(56) References Cited

U.S. PATENT DOCUMENTS

| | | | |
|---|---|---|---|
| 4,731,840 A * | 3/1988 | Mniszewski et al. | 380/284 |
| 5,081,678 A * | 1/1992 | Kaufman et al. | 713/161 |
| 5,124,117 A * | 6/1992 | Tatebayashi et al. | 380/281 |
| 5,337,362 A * | 8/1994 | Gormish et al. | 380/54 |
| 5,771,291 A * | 6/1998 | Newton et al. | 713/185 |
| 6,021,203 A * | 2/2000 | Douceur et al. | 380/252 |
| 2003/0026429 A1 * | 2/2003 | Hammersmith | 380/277 |

* cited by examiner

*Primary Examiner* — Saleh Najjar
*Assistant Examiner* — Oleg Korsak
(74) *Attorney, Agent, or Firm* — Edward J. Radlo; Radlo IP Law Group

(57) ABSTRACT

A one-time-pad encryption system where encrypted one-time-pad keys can be distributed to users on physical media or on a computer network from a central server. Each one-time-pad key has a key identification number that facilitates key management. Each encrypted data set includes a header specifying an offset within the one-time-pad key for commencement of decryption so that messages can be decrypted in any order. Before encryption begins, the length of remaining unused key is compared to the length of the data set to be encrypted. Encryption control buttons are added to a word processor and other programs as an addition to the user interface.

21 Claims, 5 Drawing Sheets

Central Key Service

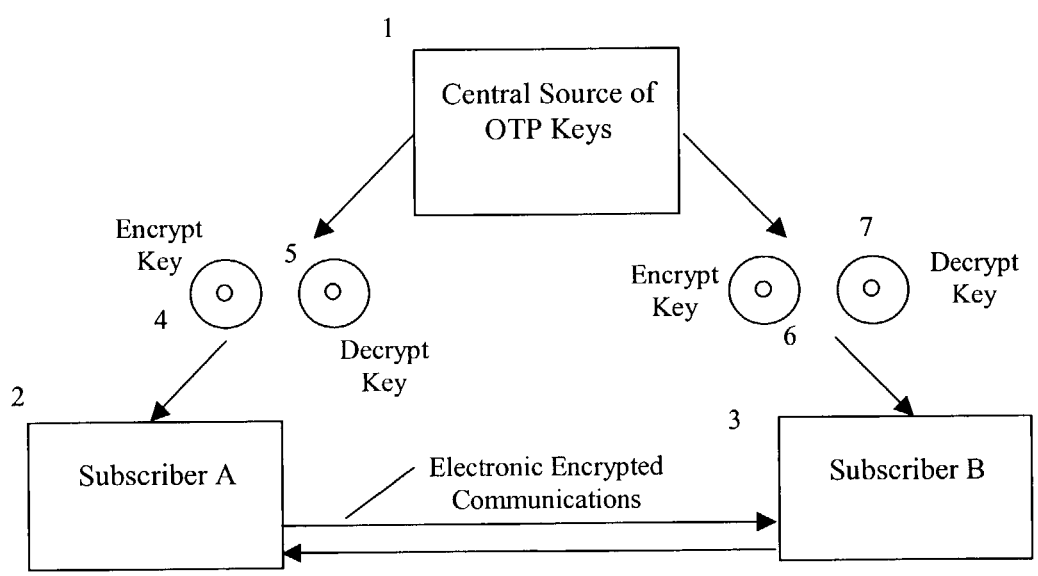
Figure 1. Central Key Service

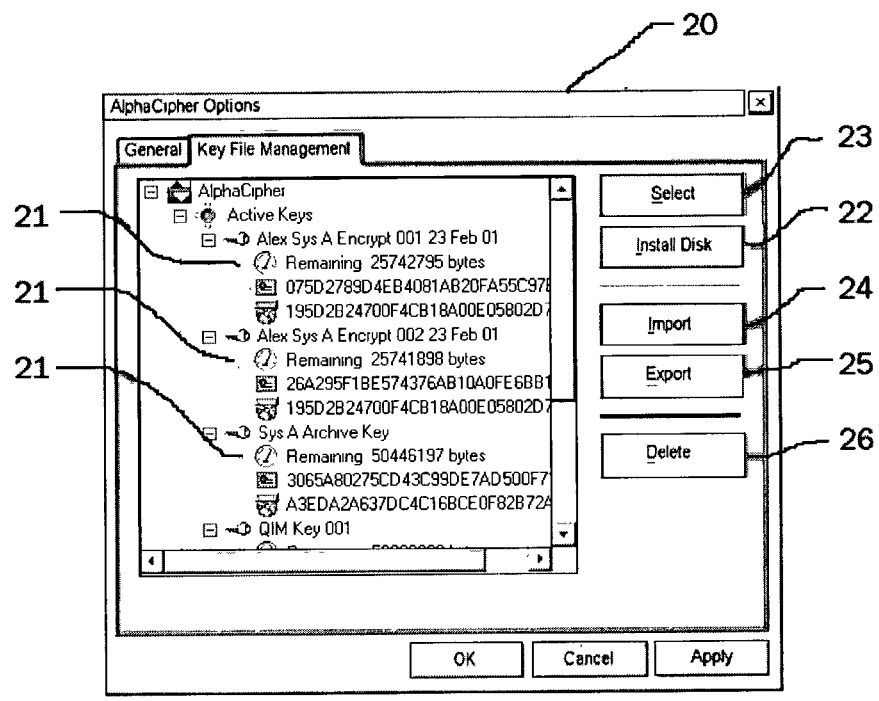
Figure 2. The Key Management Window

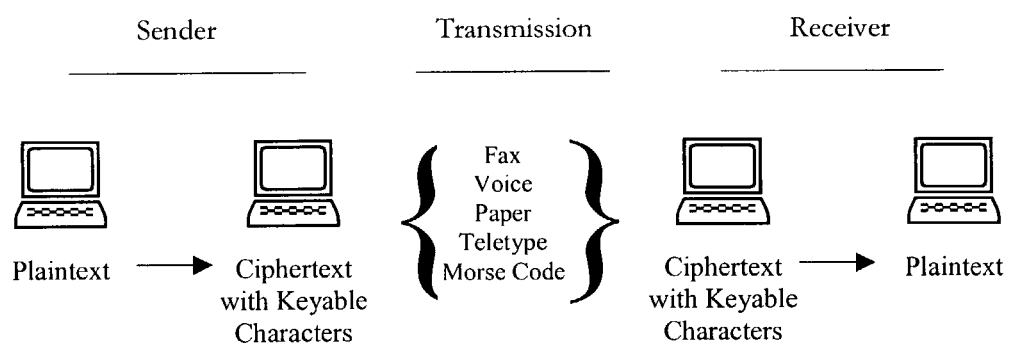
Fig. 3. Use of Keyable Ciphertext Character Set

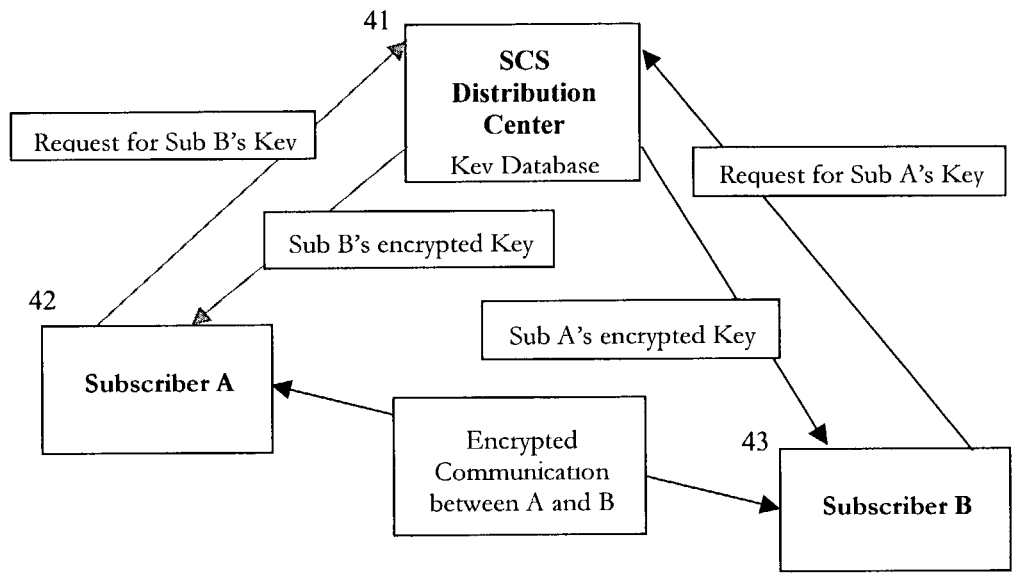
Figure 4. The SCS Communications System
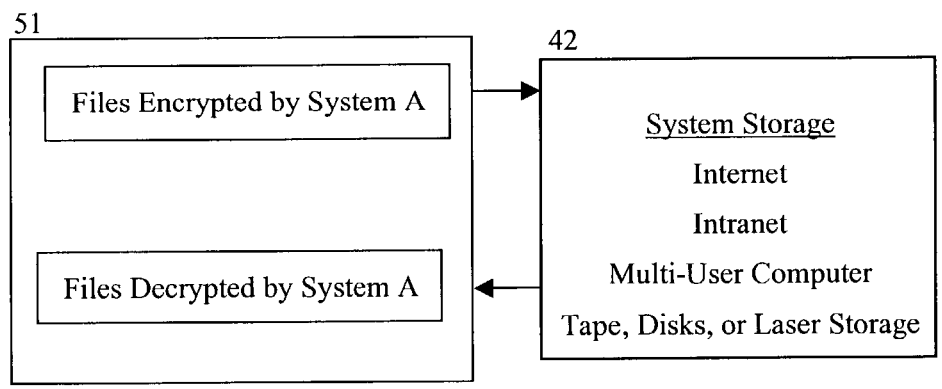
Figure 5. Data Archive Process

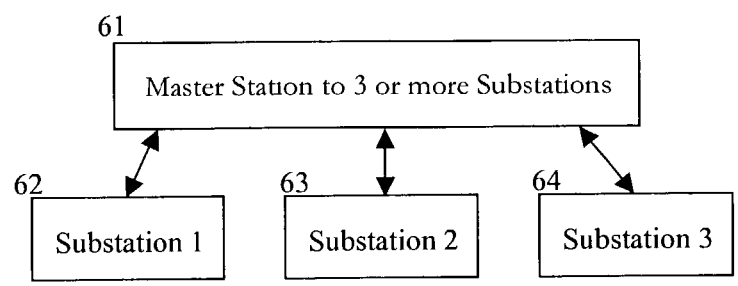
Figure 6. Master to Multiple Sub-Stations
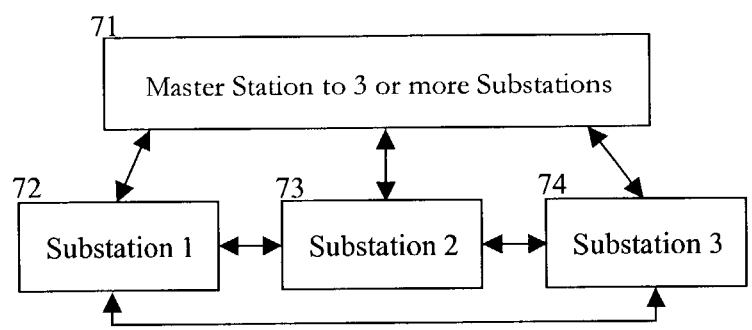
Figure 7. Ring Distribution

ONE-TIME-PAD ENCRYPTION WITH CENTRAL KEY SERVICE

This application is a continuation of application Ser. No. 10/254,495 filed Sep. 24, 2002 which issued as U.S. Pat. No. 8,467,533 and was a continuation of PCT/US01/10348 filed Mar. 29, 2001 which was a continuation of US provisional 60/193,152 filed Mar. 29, 2000 which is the claimed priority date.

FIELD OF INVENTION

This invention relates to methods for encrypting computer readable data, particularly improved one-time-pad encryption methods.

BACKGROUND

Before the advent of computers, many methods were developed for encrypting plain text into ciphertext so that a party having the appropriate key could decrypt the message to view the plain text. The methods were typically executed by humans with pen and paper and were later adapted for use with telegraph and teletype.

If the key used for encryption and decryption is as long as the message, it is referred to as a "one-time-pad" (OTP) encryption method and if the key is shorter than the message, such that the key, or a derivative of the key, must be used two or more times, it is referred to as a "repeating key" encryption method.

When computers were first developed, memory for storage of encryption keys was expensive and difficult to handle. The key for one-time pad encryption key needs to be as long as the message and must be used only once. Consequently, repeating keys were favored over one-time-pad keys because they are much smaller, typically hundreds or thousands of times smaller and can be reused. A popular repeating key method, known as public key encryption, uses different but related public and private keys for encryption and decryption.

Given a large enough sample of encrypted messages and a fast enough computer with a large enough memory, any repeating key encryption can be broken. With the recent increases in computer speed and memory size, repeating key encryption methods previously thought to provide adequate security have been broken. The only known encryption method that is provably unbreakable is one-time-pad.

The original form of one-time-pad encryption was performed using a key consisting of a random sequence of the 26 letters of the alphabet and the 10 numerals and little or no punctuation. The message was limited to the same character set as the key. To explain how it works, we assume a character set of 38 characters. If we assign to each character a value ranging from zero to 37, the encryption process can be performed by combining the first character of the message with the first character of the random key and then the second character of the message with the second character of the key, and so on. The combination process can be either addition or subtraction of the character values in base 38 (modulo 38) discarding the carry, and the decryption process is the opposite. Thus, the sum of value 35 plus the value 5 produces the value 2. Likewise, the value 2 minus the value 5 is the value 35. Such a one-time-pad encryption process can be performed with any number of characters in a character set provided the key uses the same number of possible values as the allowed number of characters in the set. Thus, for encrypting eight bit bytes which have 256 possible values, addition (or subtraction) in modulo 256 is used. When working with binary numbers where the number of possible values is a power of two, the encryption or decryption process can be executed very quickly using an exclusive-or operation to produce the same result as modulo addition or subtraction.

To encrypt a one megabyte computer file requires one megabyte of key that can not be reused. With the development of inexpensive CDs and DVDs to store a very long key, the use of one-time-pad encryption for computer communications has become practical.

SUMMARY

The advent of the Internet now allows bulky one-time-pad (OTP) keys to be distributed to a computer connected to a network such as the Internet. So that a one-time-pad key distributed on a network cannot be intercepted and then used to decrypt a message, the one-time-pad communications key is itself encrypted with a key encryption key.

The key encryption key can be a repeating key or also a one-time-pad. When a communications key is distributed to both a sender and receiver, the key encryption key can be identical for both parties so that a person who intercepts both transmissions receives identical content and cannot use any differences in content to aid with decrypting the content. Alternatively, to ensure that only one party can use each key distributed, the communications key can be encrypted with a unique key encryption key.

Instead of distributing a key of finite length to each of the sender and the receiver, the server can be configured to send them a continuous sequence of keys, each with its own identifier, such that the sender and receiver can each capture a portion of the sequence of keys and use that portion to encrypt and decrypt their messages. By this process, a sequence of one-time-pad keys can be transmitted continuously for use by the sender and receiver at any time, effectively becoming a never-ending key.

The received blocks of continuously transmitted keys are stored in a buffer until used. If the communications between the sender and receiver do not require enough bandwidth to use all of each received block, the remainder of each block is discarded.

When the one-time-pad communications keys are distributed on physical media such as CDs or DVDs, encryption of the key material renders the key unusable except with a certain copy of a communications program with the appropriate key encryption key for decrypting the communications key.

When the communications key is recorded on physical media, rather than breaking it into blocks with an identifier for each block such that the key can be used starting at the beginning of any block, locations within the key are identified with an offset number. The offset number is included as a metadata header for the encrypted message to indicate the starting point within the key for decrypting the message.

Similarly, the metadata header includes an identification of the key to facilitate matching the key with the message at the recipient's computer system. Also, the metadata header includes a length and an error checking code, both of which are used to check for errors in the encrypted message.

When a key of finite length is used, whether received on physical media or by communications across a network, before encryption begins, the length of the message is compared with the length of the key to ensure that the key is long enough to complete the encryption process.

Modern Western character sets include more than 90 characters, including upper and lower case letters, numerals, symbols, and punctuation. The characters which require use of a shift key on a standard keyboard are inconvenient to use, and characters which are difficult to distinguish, such as 0 and O are ambiguous to the human reader. Consequently, if the ciphertext is to be keyed by a human or spoken by a human as a link in the transmission process, it is advantageous to use a limited character set including only one case of each letter and only those additional symbols that can be keyed without using the shift key and are easy to visually distinguish. This is referred to as the keyable ciphertext character set.

In one embodiment, this character set consists of the 26 capitol letters of the Western alphabet. In another embodiment, it consists of these letters plus six of the numerals to make a set of 32 characters. A character set with 32 characters has certain advantages because 32 is a power of two which facilitates binary operations.

To use the keyable ciphertext character set for transmitting messages, nearly all of which use a character set that allows more than 32 characters, some of the plain text characters are represented with two ciphertext characters. To minimize the number of ciphertext characters, the most common 22 or 26 plaintext characters are each represented with one ciphertext character while all others are represented with two ciphertext characters.

The preferred one-time-pad key for encryption to the keyable ciphertext character set consists of a random sequence of bytes where each byte value is limited to the number of values in the keyable ciphertext character set (48 or fewer), preferably 26 or 32. Before encryption, the plain text is lengthened to an intermediate text containing only the characters of the keyable ciphertext character set. The intermediate text is then one-time-pad encrypted with the random sequence of bytes where the byte values are limited to the number of characters in the character set. Even though the possible byte values are limited to fewer than all 256 possible values, the one-time-pad communications key can also be used for binary encryption into ciphertext with all 256 possible values, so each key has dual uses.

Because security would be compromised if a one-time-pad encryption key were used twice, the key identification number for each key is semi-permanently written to a file in the computer system and this file is checked when a key is installed to insure it has not previously been installed. In the Windows operating systems, this file is known as the "registry". To delete this semi-permanent record, the operating system must be entirely reinstalled on the computer system or a special program must be run to delete from the registry the previously installed key such as by using the maintenance program provided in Windows called REGEDIT.EXE.

The disclosed client computer encryption and decryption computer program can work with any computer file of any file type. It can encrypt folders including all of their sub-folders and files. The controls can be incorporated into the user interface for a word processor so that an encrypt button appears in the word processor user interface, along with a decrypt button and the same can be done for other programs. When displayed information is selected and the encrypt button is pressed, the displayed material is encrypted. If the program is configured to the keyable ciphertext character set mode, the encrypted information is displayed in the preferred character set. If binary encryption mode is selected, the encrypted information is displayed with box symbols representing non-displayable characters or with whatever displayable characters the encrypted byte values happen to represent.

SUMMARY OF THE DRAWINGS

FIG. 1 shows the process of creating one-time-pad communications keys and distributing them to users, whether by computer network or on disk.

FIG. 2 shows the key management window for each user.

FIG. 3 shows how the keyable ciphertext character set is used.

FIG. 4 shows additional details on distribution of one-time-pad communications keys by a server.

FIG. 5 shows how the encryption may be used by a single user for safe storage of secure information to be retrieved only by that user.

FIG. 6 shows separate secure communications with each of three sub-stations.

FIG. 7 shows secure communications accessible by all of four parties.

DETAILED DESCRIPTION

In the text below, "plaintext" refers to the original unencrypted bytes of data, whether characters, symbols, or binary bytes, Microsoft Word 2000™ is called Word 2000, and Microsoft Windows 98™ and Microsoft Windows 2000™ are called Windows 98 and Windows 2000 respectively.

The preferred embodiment of the invention is a computer program operating in the Microsoft Windows 98 and Windows 2000 environments on an IBM compatible personal computer that performs encryption and decryption using a one time pad (OTP) cipher that conforms to the strict version of a one time pad algorithm to ensure the creation of ciphertext that is unbreakable.

The program encrypts and decrypts any message or other data set, including:

1. All files created by any Windows 98 and Windows 2000 programs including any type of picture file and all Excel files.
2. Subsections of a Word 2000 document within the document by adding to the Word 2000 toolbar additional "Encrypt" and "Decrypt" buttons.
3. Windows Folders and their file contents to any sub-folder level, creating one encrypted file for the entire hierarchy. When decrypted, the hierarchy and its file contents are re-assembled into a perfect copy of their prior structure.
4. The text or ciphertext contents of the Windows Clipboard within the Clipboard itself. Using the Clipboard, the program can keep encrypted or decrypted text information in RAM and insert it in email or any other Windows program without saving such information to disk. This prevents electron microscope media scans and other techniques from detecting deleted information on the deep layers of magnetic storage media such as a hard drive.
5. Text messages typed into the program's Text Window.

The program has full file saving and loading capabilities and can save encrypted and decrypted files to any computer storage media.

Keys for Encryption and Decryption

As shown in FIG. 1, two matching OTP keys 5 & 6, 4 & 7 are created by a central key service 1 and distributed one to each subscriber 2 & 3 for use. The keys 4, 5, 6, 7 are kept on CD's, DVD-ROMs, or other computer storage media.

Matching keys must be in the possession of the receiver and the sender in order to encrypt and decrypt the file or text. Each portion of each key is used for encryption once, and, to ensure security, only once. Replacement keys can be purchased from the manufacturer that provides a central source of OTP keys or, using a random number generator, created by the user under license from the manufacturer. Key CD's and DVD-ROMs may be copy protected.

The keys can be of any length according to the client's needs and the capacity of the storage media. Key material is preferably created from a commercially available random number generator called an SG100 manufactured by Protego in Sweden.

The program works with keys from any computer storage media including Very Large Storage Arrays (VLSA). However, for security reasons, it is not recommended that the program keys be installed on the hard disk of a computer connected to an unsecure network. For large key databases, a dedicated server in control of a subscription database called a Secure Communications System, or SCS server, discussed below, manages the VLSA.

Program Functions

The program works in two main modes: a purely binary mode where the cipher is not human-readable and a keyable ciphertext mode where the resultant ciphertext is in the 26 all capitol Western alphabet letters or the 26 letters plus 6 numbers for a total of 32 characters. Because the binary encryption process is very simple, the program kernel is fast enough to encrypt voice and real-time video communications on a contemporary Windows 98 or 2000 computer. The original plaintext encrypted by the program is not destroyed or modified in any way and remains in its original location.

The program places an icon in the Windows System Tray that, through a pop-up menu, allows the user to open the main program window, encrypt or decrypt the contents of the Windows Clipboard, or close the program. The System Tray icon stays in the system tray and is loaded each time the computer is started.

As shown in FIG. 2, the program displays a Key Management Window 20 where key usage is tracked by the program and displayed for the user. When keys come to the end of their use as indicated by a "Key Remaining" indicator in a status bar and the "Remaining" data indicator 21 in the Key Management Window for each key, they are deleted by the user and never used again. The program will not allow encryption to take place if the selected key is not large enough to handle the requested amount of encryption. The Key Remaining status bar window displays the total number of bytes left in the selected key. A "Current Key" status bar window displays a user given name or the Key Identification Number of the selected key if no user given name has been assigned. Multiple keys can be stored on one CD or other storage media, all managed through the program's Key Management Window. In this way, several types of communications systems can be implemented from a simple two-station system to a more complex system.

Text Encryption Character Set

During text encryption in the keyable ciphertext mode, the program converts all characters, including all punctuation and non-printable characters, to the ASCII capitol letters A through Z, resulting in ciphertext that is easy for humans to read and to quickly key on a keyboard. As shown in FIG. 3, this reduced character set facilitates non-computer related transcriptions of the ciphertext such as entering the ciphertext into a computer from printed media such as fax documents and other letters on paper. It also aids accuracy in the transmission of ciphertext by voice, Morse Code, and other non-computer direct methods of transmission. By using only one case of letters, the shift key never needs to be pressed. Upper case letters are easier for the eye to distinguish than lower case letters. 26 different characters are easier for a human to distinguish and work with than 52 different upper and lower case letters or the 62 alphanumerics or the 94 possible characters on a standard computer keyboard.

So that each display of the ciphertext on a standard computer will show the proper characters, the keyable ciphertext uses the regular 8 bit ASCII values in the preferred embodiment. However, when only 26 characters are represented in binary numbers, only 5 bits are required. 5 bits can represent a total of 32 characters, so 6 additional characters can be represented without making the ciphertext any larger. Also, if all possible values of 5 bit binary numbers are used for the ciphertext, the random characters for encryption can be generated by taking a long string of random bits 5 bits at a time and then converting with a look up table to preferred 8 bit representations, so any source of random bits can be used efficiently provided both the sender and the receiver have access to the same source of random binary bits.

To take advantage of these benefits of using 32 characters in the ciphertext character set, an alternate embodiment of the invention adds 6 more characters. The preferred characters are 6 of the 10 Arabic numerals because they are found on all keyboards and have representations in Morse code. Any 6 of the 10 will do, but the preferred 6 are the numerals 2-7. 0 is to be avoided because it looks too much like O. 1 is to be avoided because it looks too much like I and L and l. When faded or blurry, 6, 8, and 9 can be difficult to distinguish. It is easiest for a human to interpret blurry characters if he or she knows they are limited to certain set, and it is easiest to explain to the user the possible range of numerals if the range is contiguous. For these reasons, the range 2-7 is preferred.

Whether using 26 characters or 32 characters or any easily keyed character set up to the 48 characters that can easily be keyed on a standard computer without using the shift key, the character set is referred to herein as a Keyable Ciphertext Character Set.

Because there are only 26 to 48 characters in the Keyable Ciphertext Character Set, the resultant reduction of any standard character set into the Keyable Ciphertext Character Set requires that many characters be represented as two of the Keyable characters, resulting in a greater number of ciphertext characters than plaintext characters. If a 32 character set is used, all lowercase letters are encrypted with a one-to-one relationship to a random ciphertext character. All non-lowercase letters, including lower-case characters with accents, are represented by two random symbols of ciphertext. This method helps reduce ciphertext expansion because most messages are predominately made up of lowercase letters. By this method of using one-to-one for 26 of the possible characters and two-to-one for all other possible characters, the number of characters that can be represented is $26+32\times32\times32\times32=1,048,602$, which is enough to represent all known characters in all alphabets, including Chinese word characters.

In the embodiment which uses 26 characters, the first 22 lower case characters of the alphabet, a-v, are given a one-to-one relationship with ciphertext and all the remaining characters, including w, x, y, and z, are represented with 2 characters of ciphertext. This allows representation of a total of 22+26×26×26×26=456,998 characters, which is still enough to represent all known characters in all known languages.

An algorithm for creating this sometimes one-to-one and sometimes two-to-one relationship may be implemented as follows. First, create an intermediate text by replacing every character other than a-v (a-z in the 32 character set embodiment), with a 2 character representation starting with W, X, Y, or Z (2-7 in the 32 character set embodiment). This reduces all characters in the plaintext to the allowed character set. Then do the one-time-pad encryption in the usual way by replacing each of the 26 or 32 characters in the intermediate text with another one of the 26 or 32 characters randomly produced by combining it with the next one of the 26 or 32 characters in the key.

In text mode, the program offers the user an option to reduce the size of output files using a zero loss compression algorithm. With this option checked, the program's output cipher files are significantly reduced in volume automatically before storage. The preferred algorithm is licensed from the distributor of the PKZip software, PK Ware, Inc., http://www.pkware.com. Because each character of ciphertext is represented by 8 bits and there are only 26 or 32 different characters in the text mode ciphertext out of a possible 256 8 bit characters, large amounts of zero loss compression are possible in text mode. In binary mode, because the ciphertext is entirely random and all possible byte values are used, no compression is possible.

Key Rendered Non-Random

For use with text, as described above, the ciphertext consists of 26 or 32 characters. Consequently, for use in the one time pad encryption process, the key should have only these 26 or 32 characters, the frequency of occurrence of each character being entirely random. For the embodiment that uses 32 characters, this can be accomplished by starting with any long string of random bits and taking them 5 at a time. If the original string is random, then each 5 bit byte will randomly contain each of 32 possible values. To represent the 32 keyable characters using 8 bit ASCII values, a look up table quickly converts to ASCII. Consequently, for the 32 character embodiment, the same key material can be used for both text encryption taking the key 5 bits at a time or for binary encryption using 8 bits at a time, making the keys last longer in text mode. Alternatively, for either the embodiment that uses 26 characters or the embodiment that uses 32 characters, reducing a sequence of random bytes to only 26 or 32 characters can be accomplished by using a random byte generator (or taking random bits 8 at a time, which is the same thing) and throwing out all bytes other than the 26 or 32 bytes that represent characters within the set.

However, if merely random key CDs or other key media are distributed to the users for use with the program, then the media can be used with any encryption program as a source of random characters or numbers. Likewise, the program can then be used with any source of random characters or numbers. For business reasons, it is preferable that the program only be usable with an authorized CD and that the CDs only be usable with an authorized program. Therefore, before the key is recorded on the disk, it is processed through a reversible algorithm that renders the key no longer a random sequence of characters. Because the key as recorded on the key media is non-random, it is not usable for encryption without running it through the reverse algorithm to render it random again. This process of starting with a random key, then rendering it non-random, and then rendering it random again at the time of use can easily be achieved with a one-to-one relationship between 8 bit bytes of the original key consisting of 26 or 32 characters and 8 bit bytes of the key in non-random form because the non-random form can use any of the 256 possible values for each byte.

To render each communications key non-random before it is recorded on the CD or DVD or other media, many different algorithms may be used. A suitable method is to encrypt each key with a repeating key encryption key by XORing the communications key with a string of bytes used over and over. The string of bytes is preferably between 1,000 bytes and 50,000 bytes long, stored as a file. When the XOR process reaches the end of the string of bytes, the file pointer is reset to the beginning of the file and the string of bytes is re-used until the file reaches the End of File indicator. Any repeating key cipher may be used, such as Vernam, autokey or DES.

With repeating key obfuscation of the raw key data, the communications key cannot be read or modified in an ordinary way by the user or copied and used by a competitor's encryption program. When the program reads a key file, it uses its own built-in key encryption key to decrypt the portions of the key it will use. For a version of the program, so that all programs work together and all keys for that version work with all the programs, the key encryption key is identical in every instance of the program and every instance of every key produced.

Use of the Keys for Binary Encryption

The binary encryption user-selectable option of the program does not use the Keyable Ciphertext Character Set because voice and video encryption are of a volume that makes manual input impractical. Instead, it uses all 256 possible 8 bit bytes in cipher to represent the 8 bit bytes of original material. In the program's binary encryption mode, there is a direct relationship between each key byte and each plaintext byte, resulting in a one-to-one relationship between key bytes and plaintext bytes.

For versions of the program that can do both keyable ciphertext encryption and binary encryption, the same key that is used for keyable ciphertext encryption may be used for binary encryption. When the key is used for 26 character encryption, the encryption process uses an algorithm for base 26 addition and discard the carry (modulo 26 addition), with a conversion to binary, to combine the plaintext with the key and yield the ciphertext. For binary encryption, the process is much faster because modulo addition can be done in binary by simply executing an exclusive-or operation (XOR) on the plaintext and the key, bit by bit, to produce the ciphertext. Because the key contains only the 8 bit values of the 26 ASCII characters, every byte has the same value in two of the bit positions. Therefore, with respect to the bits in each byte, the key is not entirely random and 2 bits of each byte in the ciphertext can be easily decrypted. However, at the byte level, the values of each byte in the key are random and the remaining bits can not be decrypted. Therefore, the key can be used for binary encryption as well as for keyable ciphertext encryption without compromise of security and the binary encryption runs as fast as with a key of all possible byte values.

Key Disk Contents

Each memory medium containing one or more keys is identified with a 32 byte Disk ID, which is a globally unique identifier (GUID) consisting only of characters that are permitted in a file name in all common file systems (58 case insensitive characters in Microsoft systems). Preferably, each GUID is created with an algorithmic relationship between successive characters rather than a random relationship. Each user that is licensed to create key disks is given a key generator program that creates a unique Disk ID GUID for each disk during the key production process. The Disk ID is stored on the memory medium in a file which has the same 32 byte name as the file contents.

In one embodiment of the invented system, the GUID creation algorithm published by Microsoft is used. Although it is theoretically possible that two different copies of this program will generate two GUIDs that are identical, the chances are very small and small enough to be acceptable. The Microsoft GUID creation system uses alphanumeric characters with curly braces and dashes as punctuation. For use as a Disk ID, the curly braces and dashes generated by the Microsoft algorithm are removed.

In another embodiment, for ease of reading and keying by humans, the characters used for the GUID are the preferred 32 Keyable Ciphertext Characters (A-Z+2-7). To ensure that no two GUIDs are the same, the last 4 characters of the 32 character GUID are reserved to identify the manufacturer of that particular disk, allowing identification of 1,048,576 possible manufacturers (32×32×32×32). The first 28 characters are filled in by a program that never generates the same number twice until all possible numbers have been used ($32^{28}$).

Information for each key on the storage media consists of the following data that is stored as the contents of a large file using whatever file layout format is required for that media:
1. The first 32 8 bit bytes is a Key Identification Number (KIN), which is a Globally Unique Identifier (GUID) using the same characters that are permitted in a Disk ID as described above. Again, the last four characters identify the manufacturer of the key in one embodiment. For simplicity, repeating key encryption is applied to the entire contents of the key file, including the KIN. When the key is stored on a disk, the Key Identification Number, in non-repeating key-encrypted form, is copied to the file allocation table as the file name within the file system on the media.
2. In one embodiment, the Disk ID is stored as the second 32 bytes to make it difficult for the contents of the key media to be copied to other media, reinstalled, and reused.
3. The key itself, which is a long sequence of 26 or 32 character bytes used for encryption of the original material, is stored in repeating key encrypted form.

Preferably, one key (including the Key Identification Number) or a pair of keys, one for encrypting and one for decrypting, fills up the entire media, usually a CD or DVD, except for the Disk ID file. However, any number of keys can be stored in one memory medium, each as a file with whatever file organization method is used on the medium.

The key file name consists of the KIN as described above followed by either .ENC file extension for the encrypting key or .DEC for the decrypting key. Following is a sample of a GUID used for the KIN and the file name for the key pair:

3AA91601F83211D49D6A0008C7A23A01.ENC
3AA91601F83211D49D6A0008C7A23A01.DEC

When a key is installed on a computer system, its offset number (the location in the key file where the usable portion of the key begins which initially is the $33^{rd}$ byte following the initial 32 byte KIN), size, name, and Disk ID are stored in the resident computer's registry. These registry entries remain with the system as long as the program is installed, and key information consisting of the key name, disk ID, and offset remain in the registry after the program is uninstalled in case the program is reinstalled on that system in the future. A special uninstall process, separate from the program's standard uninstall facility, is required to remove the resident registry data. The persistence of the registry data after an uninstall of the program helps prevent the unintentional reuse of the keys should another instance of the program be installed at a later time.

Of course, any cipher system can be intentionally misused, resulting in a breech of security. There is no technical means to prevent a pair of CD's or other key media containing the same key from being used again on a second pair of computer systems that had not used the key before. Because this would compromise security for both the first and the second user if an attacker were to get copies of a large volume of messages where the same key was used, facilitating analysis in depth attacks, the users have a strong incentive to destroy any CDs or other storage media containing used keys.

Ciphertext Contents

The body of ciphertext created by the program contains the following header information (metadata):
|KIN|Offset|Length|CRC|binary/text|

The KIN identifies the key that was used to create the message. The Offset represents the starting place from the beginning of the usable key (following the 32 byte KIN) for the program to start decryption. The length of the encrypted message is used to facilitate error checking by simply comparing the observed length of the message with this number. The CRC is a checksum of the ciphertext used in error detection. The binary/text designation instructs the receiving program whether to decrypt in binary mode or keyable ciphertext mode.

Since each message Offset identifies where the program must start decrypting the message within that particular key, the encrypted messages may be decrypted in any order, unlike the traditional one time pad where encrypted messages had to be decrypted in the order in which they were encrypted to maintain a proper index within the decrypt key.

The CRC (checksum process) uses an algorithm that can detect the substitution, subtraction, or addition of a single character in a field of 100 million characters. Although an error changing one character to another is usually inconsequential, changing the length by subtracting or adding even one character will render the message indecipherable by any means. The program will therefore be prevented from decrypting ciphertext if a single character is added or subtracted, so a check for a one-to-one character relationship is mandatory in the program's design. Substitutions are the least harmful because they only effect between 1 and 2 characters of plaintext. However, the CRC algorithm finds these as well.

Program Operation

Using the functions accessed via a Key Management Window as shown in FIG. 2, each key stored on the media can be:
1. Installed. The Install button 22 registers the Disk ID number in the Windows
Registry (or a similar registry for any other operating system) along with the repeating key decrypted Key Identification Number and key usage information and displays key information in the Key Management Window 20. If the key CD cannot be installed or it does not contain a valid Disk ID, a message informs the user that installation cannot take place.
2. Selected for use. Encryption will be carried out with the key selected with the Select button 23.
3. Imported from another system along with usage data. The usage data is used to ensure that the used portions of the imported key will not be reused. The usage data may be imported across a network or read from a floppy disk with the Import button 24.

4. Exported to another system along with usage data. The usage data provides to the receiving system the information it needs to ensure key reuse will not occur. The usage data may be exported across a network or saved to a floppy disk with the Export button 25.

5. Renamed with a User Given Name. For the initial Key Name, the Key Management Window displays a copy of the repeating key decrypted Key Identification Number (which is also displayed in the Key Management Window 20 two lines below as the Key Identification Number). Right-clicking the Key Name brings up a menu that allows the user to rename the key with any preferred name, such as "Jim's Office" or "Seattle Center." If the original Key Name or file name is modified by the user with the intent to reinstall a used key, the embedded KIN prevents key reuse by comparing the repeating key decrypted KIN of each new key to the KIN of previously installed keys listed in the computer's Registry. Installation is not allowed if there is a match. Neither the Key Name nor the key file name is used in the comparison. The KIN is always used to identify the key regardless of any changes to the Key Name or key file name made by the user.

6. Deleted. Once Deleted by pressing the Delete button 26, a key cannot be reused on that computer during the lifetime of the program's installation on the computer. Deleting a key updates the Windows Registry to indicate that the key has been entirely used, compromised by being stolen, damaged, or otherwise indisposed.

Renaming a key to a friendly name makes it easier for the user to know which key to select. To select a key, the user clicks on the name of the key in the Key Management Window and presses the "Select" button. If the selected key is not present on the currently installed CD or other key storage media, the program asks the user to insert the proper media. The request is repeated until the media containing the selected key is installed or the selection process is cancelled.

When the key is installed, the KIN is read by the program, repeating key decrypted, and authenticated as a valid GUID according to the algorithm for creating a GUID. The GUID is checked to ensure it contains only permitted characters. GUIDs are generated with an algorithmic relationship between successive characters rather than a random relationship, and this relationship is verified. If the KIN is verified, it is displayed in the Key Management Window 20 in the section for that key. If the KIN is not correct or absent, the program will not allow the associated key to be installed.

The program displays a General Options dialog box containing user-selectable options discussed below.

"Run the program in the background when Windows starts": This option places an icon for the program in the System Tray for easy access to encrypt and decrypt functions and as an alternate way to open the main program.

"Create Zip File for Files and Folders Encrypted": This function automatically converts files into a standard Zip file format as the last step in encryption. This makes the file smaller, making network transmission many times faster.

"Use wizards for encrypting and decrypting files": This option opens helpful wizards to instruct the user in file and folder encryption and decryption.

"Quick encrypt and decrypt": This option opens simple dialog boxes for experienced users to decrypt and encrypt files.

Direct Communications Mode

The program may be used for direct communication between two points if both locations have identical keys. This is called the Direct Communications Mode. Communication between two locations, Location A and Location B in the table below, is the most basic way in which the program functions.

| Location A | Location B |
|---|---|
| A Encrypt Key = | B Decrypt Key |
| A Decrypt Key = | B Encrypt Key |

The "A Encrypt Key" is identical in key content to the "B Decrypt Key." The "A Decrypt Key" is identical in key content to the "B Encrypt Key." At Location A, the A Encrypt Key amount used is tracked and stored by the program and, at Location B, the same thing happens for the B Decrypt Key. When Location B receives a message from Location A, the B Decrypt Key is used to decrypt the message starting at the offset indicated by the message header.

The Decrypt Keys can be used over and over again each time the recipient wants to read a particular encrypted message with no compromise in security because the message and key content are tied together by the KIN embedded in the key and the KIN and the offset data embedded in the message header. The key used to encrypt a particular message will never again be used for any other message, so there is no limit to the number of times an encrypted message can be decrypted. This is a great boon to people who must store large or small volumes of messages on public storage centers like Driveway and similar online businesses. The encrypted messages may be downloaded and decrypted as many times as the user wishes without a key use penalty.

The Encrypt Key at both stations is consumable, meaning that as messages are sent out, the Encrypt Key is used until it is too small to encrypt another message. The program then informs the user that the remaining Encrypt Key is too small for the current message and prompts the user to select or install another key. By contrast, the Decrypt Key is used as many times as desired and must be retained until the saved encrypted messages never again need to be decrypted.

The amount of Encrypt Key remaining for the selected key is displayed in the program's status bar along with the key's file name or user assigned name.

Any two stations can communicate until their Encrypt Keys are consumed, at which time they install a new Key Set and begin again. Key Sets can be as large as 650 MB for each key on a pair of CDs, 8 Gigabytes on a DVD-ROM, and any size on large enough storage media.

SCS Server Communications

The Secure Communications System server enables direct, encrypted communications between two or more people who cannot physically exchange keys. Normally, as shown in FIG. 1, one of the parties who wish to communicate obtains a matched set from the central source and physically delivers a key CD or other storage media to the other and then begins communication. In some cases, physical delivery of a key disk from the source to the first party or from either of them to the second party is not possible. In this case, the key delivery shown in FIG. 1 may be accomplished by electronic communications as shown in FIG. 4.

When two or more people subscribe to the SCS service shown in FIG. 4, they are each sent a CD or larger storage media containing the program and a SCS key encryption key that allows them to download communications keys from the SCS Distribution Center. The communications keys that are downloaded are encrypted with the SCS key encryption key so only a party with the SCS key encryption key can use the communications key for encryption or decryption. Encryption with the SCS key does not include the KIN. Because the communications keys are encrypted with the SCS keys, other repeating key obfuscation as described above is unnecessary. After each party downloads and decrypts its copy of the pair of communications keys, the parties involved then use the communications keys to communicate directly with each other without passing their encrypted messages through the SCS Distribution Center.

This enhances privacy because, as the keys are downloaded from the SCS Distribution Center, they are destroyed in the SCS database. The SCS database maintains no copies of the communications keys downloaded unless requested to do so by the owner of the key subscription. Communication between the subscribers using the downloaded keys takes place over a different connection, usually through their own phone lines or satellite systems or the Internet, as shown in FIG. 4.

As shown in FIG. 4, acquisition of keys is controlled by the following process, or a variation of this process. Subscriber A 42 requests Subscriber B's communications key set. In order for the SCS Distribution Center 41 to release Subscriber B's communications key set, the exchange must be pre-approved by Subscriber B 43. After approval, Subscriber A may then download Subscriber B's key set, and Subscriber B is able to download Subscriber A's key set. Communication then takes place directly between Subscriber A and Subscriber B outside of the SCS Distribution Center.

The SCS Distribution Center 41 destroys its copies of the communications keys as they are sent to the Subscribers unless specifically requested not to do so. Keys archived at user request are kept on a separate SCS Distribution Center server for a pre-determined period of time at the user's expense.

As noted above, before transmission by the server, the communications keys are, themselves, encrypted by a SCS key encryption key that is distributed to each subscriber to the SCS service at the time of subscription. The communications key is created upon demand, encrypted with the SCS key, and then destroyed as it is transmitted to the subscribers who wish to communicate. The encrypted communications keys are transmitted in packets which are blocks of 512, 1024, or larger, and each block is verified as received in tact by the program before it is destroyed on the SCS server, preventing transmission errors from ruining the key. The SCS key encryption key is used to encrypt the communications key and prevents the blocks of communications key from being intercepted and used by non-subscribers or other non-authorized subscribers. No other subscriber can obtain and use a communications key set meant for another subscriber without authorization between the subscribers. The program decrypts each communications key as it is received by each user, making it ready for communications between the users.

For maximum security, the SCS key encryption key is preferably a one-time-pad key that is as long as the pair of communications keys to be downloaded and is preferably physically delivered on a CD or DVD or alternatively delivered by network download. When the matching SCS key encryption key kept on the server is consumed, the subscriber has the option to renew the subscription and receive a new SCS key recorded on CD, DVD, or other removable computer storage media or sent by network download.

This embodiment is used only for binary encryption, so the communications keys preferably use all possible byte values. Consequently, because the plaintext to be encrypted with the SCS key is merely a random sequence of all possible byte values, an encryption method using a repeating key is sufficient because the plaintext is not recognizable by a human or by a computer when it is successfully decrypted. The KIN, which is known from the file name, is not encrypted. Consequently, the SCS key can be a repeating key for RSA public key encryption or DES encryption or autokey encryption or any of many other methods, provided a different SCS key is given to each pair of communicating users.

Alternatively, instead of downloading to the sender and receiver communications keys each with a beginning, a length, and an end, the SCS server can be configured to endlessly generate and transmit to both parties a never ending communications key, encrypted with the SCS key encryption key and broken into blocks with a block identifier at the beginning of each block. A desirable length for each block is between 1 kilobyte and 1 megabyte. A convenient identifier for each block is the date and time that it is transmitted. Then, by secure means, one party specifies to the other an identifier of a block (date and time) which the sender will use to begin encrypting a message that is sent to the receiver. The receiver then begins recording the key sent from the SCS server starting at that block identifier and records enough of the never ending key to decrypt the message which is received from the sender.

The received key and message can be retained for any length of time. Alternatively, the key can be retained only in volatile memory and only long enough to use it for decryption before erasing the key as well as the message. Then any interceptor that intercepted a copy of the message can not force the sender, the SCS server, or the receiver to reveal the decryption key because all copies of it have been destroyed. Neither the sender nor the SCS server ever kept a copy but instead only generated or used it on the fly.

The never ending key can be generated and transmitted to both parties at sufficient speed that it can be decrypted and used on the fly to encrypt real time voice or video conference communications. For simultaneous duplex communications two never ending keys would be transmitted to each party at the same time. The speed of key generation need only be as fast as the fastest of such voice or video communications. Buffers can be used to accommodate speed differences. If the communication is slower than the speed at which the key is provided, the encryption can use only a portion of each block of the key, discarding the balance.

Instead of being generated and transmitted continuously without interruption forever, the key can be simply generated and transmitted over a period of time that is sufficient for the sender and recipient, such as 8 hours each day during working hours or during a specified 4 hour or 6 hour period of time.

Archive Capabilities

The program can encrypt files for storage on public databases or local multi-user computers. FIG. 5 shows files archived to any type of publicly accessible storage facility 52.

All the encrypted files kept in a public storage facility can be downloaded by anyone, but only a user with a key associated with those files, shown as System A 51 in FIG. 5, can decrypt and read them. This eliminates concern over file security at the storage facility, although the facility needs to maintain the usual standards against vandalism and other physical and hacker attacks that could erase or alter the stored encrypted files. Unless damage consisting of additions or subtractions to the ciphertext can be undone, the file will not be decipherable. Substitution damage will also be detected by the program and the damaged file will be rejected for decryption.

Versatile Communications Structures

The program can be configured to communicate between several substations in different ways. Key Sets for 3, 4, 5, 8, 10, and 20 substations or any number of substations can communicate with a Master Station and each other on a restricted, or open, basis.

As shown in FIG. 6, the program can communicate securely with three Substations 62, 63, 64 that cannot communicate securely between themselves. Each Substation's traffic is received and decrypted at the Master Station 61 and individual replies are sent from the Master Station to each Substation. If Substation 3 receives traffic from Substation 1 or 2 in error, it cannot be decrypted.

The Key Management Window 20 shown in FIG. 2 facilitates handling the complex key arrangements. Each key can be individually named (for example, "Substation 1"). This greatly reduces the difficulty in using the proper key for a particular station. As mentioned above, if a user selects a key that is not on the currently inserted CD, the program asks for the correct CD to be inserted, reducing possible errors in key selection.

As shown in FIG. 7, relationships can be established that allow Substations 72, 73, 74 to communicate securely with each other as well as with the Master Station 71. This form of communication can function well with a research group that is spread over a wide geographical area or within a corporation where data is to be kept within a specific department but stored on a corporate intranet.

The program is designed to be versatile and can be configured to match any communications need. For example, department managers can communicate with department heads through a public database or intranet without fear of compromise. Manager's reports that are sent to the department heads cannot be read by anyone else who is not authorized to possess the department head's key.

Authentication, Digital Signatures, and Biometric Data

Authentication is built-in to the program's ciphertext protocol. Just as with a digital signature, only the individual in possession of a key can decrypt messages from the opposite station. If a message is successfully decrypted with the sender's key, the program's logic forces the assumption that it must have been encrypted by a person having access to the sender's key. Therefore, as far as the program is concerned, the message is genuine, originating from the possessor of the encryption key, and is therefore authenticated. This authentication process assumes that other variables that are impossible for the program to identify, such as theft of the key, have not occurred. As with most forms of authentication, if the encryption disk or digital signature or the PGP key or the private key of a public key encryption system is stolen, the thief becomes the authorized user. The program can also encrypt a password or PIN or biometric data with the message contents, adding another level of authentication that is in unbreakable ciphertext.

The invention claimed is:

1. A method for providing an arbitrarily long sequence of encrypted bits comprising a plurality of variable length one-time-pad communications keys by a server over a computer network to a sender and a receiver, the method comprising the steps of the server:
   receiving a series of random numbers from a random number generator;
   using said series of random numbers to generate an arbitrarily long sequence of encrypted bits comprising a plurality of variable length one-time-pad communications keys; and
   transmitting said sequence over the computer network to the sender and the receiver, said sequence encrypted with a key encryption key.

2. The method of claim 1, wherein the sequence comprises a plurality of portions having variable lengths, each portion having an associated identifier and being encrypted with a different portion of the key encryption key.

3. The method of claim 2, wherein the portions are generated and transmitted by the server in a sequential stream continuously.

4. The method of claim 1, wherein the key encryption key is a one-time-pad key.

5. The method of claim 1, wherein the key encryption key is a repeating key.

6. The method of claim 1, where each of the one-time-pad communications keys is encrypted with a portion of the key encryption key that is the same for the sender as for the receiver.

7. A method for a sending computer to use a one-time-pad communications key to encrypt and transmit a data set to a receiving computer, the method comprising the steps of the sending computer:
   receiving from a key server over a network an arbitrarily long sequence of encrypted bits comprising a plurality of variable length one-time-pad communications keys, each communications key having an identifier;
   decrypting one of the received one-time-pad communication keys using at least a portion of a key encryption key also received from the server;
   encrypting the data set using said decrypted one-time-pad communications key to produce an encrypted data set; and
   transmitting said encrypted data set to the receiving computer over the network along with the identifier for subsequent use by the receiving computer.

8. The method of claim 7, further comprising the steps of the sending computer:
   using said decrypted one-time-pad communications key to encrypt the data set starting at an offset location within said decrypted one-time-pad communications key; and
   sending to said receiving computer an offset number specifying said offset location.

9. The method of claim 7, wherein the receiving computer:
   receives the encrypted da to set along with the identifier;
   uses said identifier to select a corresponding one-time-pad communications key; and
   uses said selected one-time-pad communications key to decrypt said encrypted data set.

10. The method of claim 7, wherein the identifier identifies a specific communications key within the sequence.

11. A method for a sending computer to use a one-time-pad communications key to encrypt and transmit a data set to a receiving computer, the method comprising the steps of the sending computer:
   receiving a sequence of encrypted bits comprising a plurality of variable length one-time-pad communications keys, each communications key having an identifier, from a key server over a network;

decrypting a one-time-pad communications key using at least a portion of a key encryption key received from the server;

encrypting a data set using said decrypted one-time-pad communications key; and transmitting said encrypted data set to the receiving computer over the network along with the identifier for subsequent use by the receiving computer;

wherein the identifier identifies a specific communications key within the sequence; and portions of the sequence not used to encrypt said data set are discarded.

12. The method of claim 7, wherein the encrypting and decrypting steps use binary encryption and decryption.

13. The method of claim 7, wherein the encrypted data set is sent to the receiving computer with a key identification number identifying said one-time-pad communications key.

14. The method of claim 7, wherein the encrypted data set is sent to the receiving computer with information for checking the data set for errors.

15. At least one non-transitory computer readable medium operable in conjunction with a processing device, said medium comprising instructions for enabling the processing device to perform the steps of:

receiving a series of random numbers from a random number generator;

using said series of random numbers to generate a sequence of encrypted bits comprising a plurality of variable length one-time-pad communications keys, each communications key having an identifier; and transmitting said sequence via a network to a data set sender and a data set receiver, said sequence encrypted with at least one key encryption key;

wherein:

at least a portion of said sequence is stored on each of a pair of computer readable data carriers, a first carrier used by the data set sender to encrypt plaintext to be sent to the data set receiver, and a second carrier used by the data set receiver to decrypt ciphertext received from the data set sender.

16. The computer readable medium of claim 15, wherein the carriers are physical, portable data memories.

17. The computer readable medium of claim 15, wherein the carriers are non-transitory carrier signals having electronic intra-computer communications.

18. The computer readable medium of claim 15, wherein the same key encryption key is used to encrypt the communications keys on each carrier.

19. The computer readable medium of claim 15, wherein the key encryption key used to encrypt the communications key(s) on the first carrier is different from the key encryption key used to encrypt the communications key(s) on the second carrier.

20. The computer readable medium of claim 18, wherein at least one communications key is encrypted with a one-time-pad key.

21. The computer readable medium of claim 18, wherein at least one communications key is encrypted with a repeating key.

* * * * *